(12) United States Patent
Wicks

(10) Patent No.: US 9,809,177 B1
(45) Date of Patent: Nov. 7, 2017

(54) POLYMERIC COMPONENTS WITH INTEGRAL CONNECTORS

(71) Applicant: Ivan W. Wicks, Novi, MI (US)

(72) Inventor: Ivan W. Wicks, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/159,078

(22) Filed: May 19, 2016

(51) Int. Cl.
  *B60R 13/04* (2006.01)
(52) U.S. Cl.
  CPC .................................... *B60R 13/04* (2013.01)
(58) Field of Classification Search
  CPC ................................ B60R 13/04; B60R 13/06
  USPC ...... 296/39.1, 1.08; 52/716.5–716.8; 24/289, 24/292, 295, 297; 428/31
  See application file for complete search history.

(56) References Cited

U.S. PATENT DOCUMENTS

| | | | | |
|---|---|---|---|---|
| 3,514,887 A * | 6/1970 | Jacob | ................... | A47G 19/025 40/324 |
| 5,202,172 A * | 4/1993 | Graf | ........................ | F16B 5/123 24/292 |
| 5,229,175 A * | 7/1993 | Seabolt | ................... | B60R 13/04 24/289 |
| 5,275,455 A * | 1/1994 | Harney | ................... | B60R 13/04 24/297 |
| 5,639,140 A * | 6/1997 | Labrash | .............. | B60R 11/0217 181/150 |
| 6,179,359 B1 * | 1/2001 | Clauson | .............. | B60R 13/0206 296/203.02 |
| 7,445,233 B2 * | 11/2008 | McKimson | ........... | B60R 13/025 280/728.2 |
| 8,276,961 B2 * | 10/2012 | Kwolek | .............. | B60R 13/0206 24/289 |
| 8,461,465 B2 * | 6/2013 | Golko | .................. | H01R 13/516 174/359 |

* cited by examiner

*Primary Examiner* — Dennis H Pedder
(74) *Attorney, Agent, or Firm* — Ralph E. Smith

(57) ABSTRACT

In at least one implementation, a first component includes a first connector and a second component includes a second connector adapted to couple with the first connector to connect together the first component and second component. The first component may be formed from a polymer and have an exterior show surface, and the first connector may have a first opening bounded by a retainer. The second component may also be formed from a polymer and include an exterior show surface, and the second connector may have a second opening and a flexible and resilient tab that has an unflexed position in which the tab at least partially overlaps the opening. In assembly, the first connector is coupled to the second connector with the retainer at least partially extending through the second opening, the tab being received within the first opening and overlapped by the retainer.

11 Claims, 5 Drawing Sheets

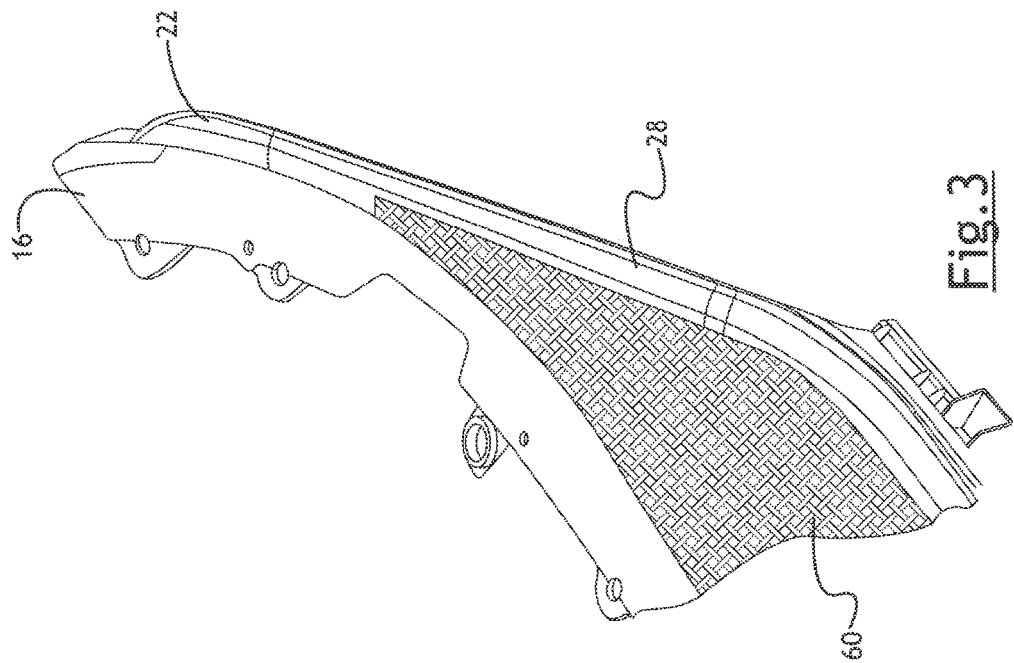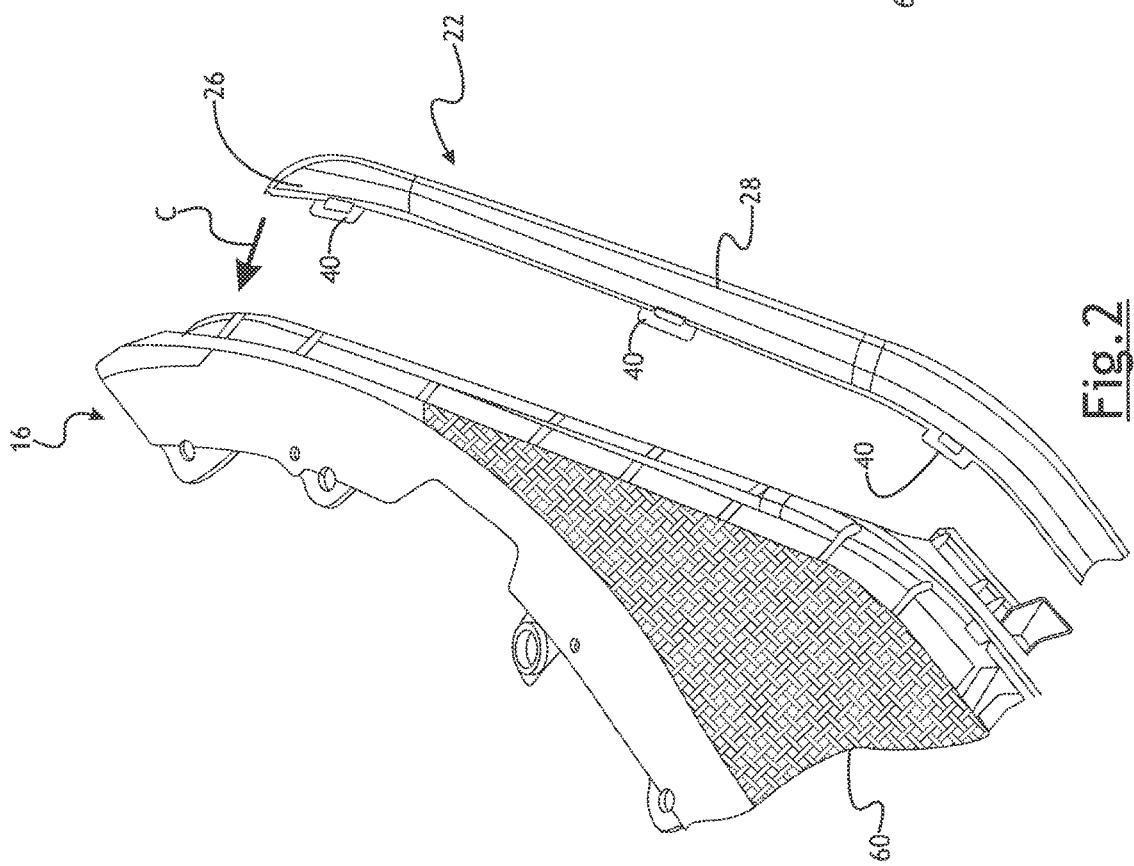

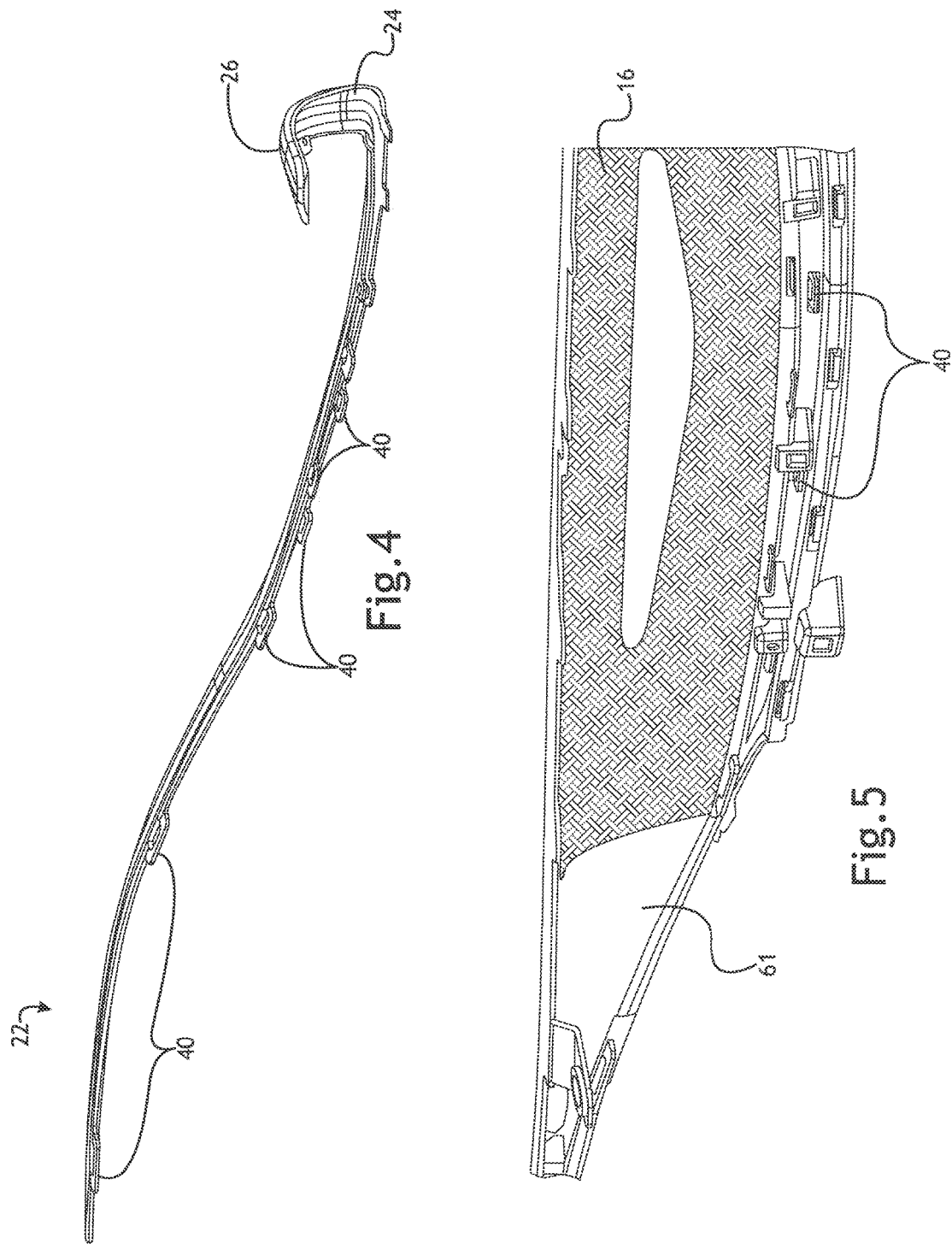

POLYMERIC COMPONENTS WITH INTEGRAL CONNECTORS

FIELD

The present disclosure relates to polymeric components with integral connectors.

BACKGROUND

Automotive vehicles include an exterior comprised of a plurality of individual panels and trim components interconnected together and connected to a vehicle frame or support structure. The components may be connected together by fasteners like bolts and screws or glued or welded together. Handling multiple components and fasteners increases the complexity, cost and time to assemble the vehicle. Further, with some components that are connected together by a clip or the like, a component made of a softer material becomes scratched when engaged by a material made of a harder material which degrades the appearance of the component and/or requires a repair or replacement of the damaged component.

SUMMARY

In at least one implementation, a first component includes a first connector and a second component includes a second connector adapted to couple with the first connector to connect together the first component and second component. The first component may be formed from a polymer and have an exterior show surface, and the first connector may have a first opening bounded by a retainer. The second component may also be formed from a polymer and include an exterior show surface, and the second connector may have a second opening and a flexible and resilient tab that has an unflexed position in which the tab at least partially overlaps the opening. The first opening is spaced from the show surface of the first component and the second opening and tab are spaced from the show surface of the second component and, in assembly, the first connector is coupled to the second connector with the retainer at least partially extending through the second opening, the tab being received within the first opening and overlapped by the retainer. Removal of the first component from the second component is inhibited by interference between the tab and the first component, and the show surface of the first component and the show surface of the second component are both visible from an exterior of the coupled components.

In at least some implementations, an exterior automotive body assembly includes a first exterior automotive body component coupled to a second exterior automotive body component. The first component is formed from a polymer and includes a main body having an exterior show surface and a first connector fixed to the main body, the first connector having a first opening bounded by a retainer. The second exterior automotive body component is formed from a polymer and includes a main body having an exterior show surface and a second connector fixed to the main body, the second connector having a second opening and a flexible and resilient tab. The tab has an unflexed position in which the tab at least partially overlaps the opening and reduces at least one dimension of the opening. The first opening is spaced from the show surface of the first component and the second opening and tab are spaced from the show surface of the second component. In assembly, the first connector is coupled to the second connector with the retainer at least partially extending through the second opening, and the tab being received within the first opening and overlapped by the retainer. Removal of the first component from the second component is inhibited by interference between the tab and the first component, and the show surface of the first component and the show surface of the second component are both visible from an exterior of the coupled components.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 2 is an exploded, perspective, front view of a portion of a grille and a trim piece including integral connectors;

FIG. 3 is a perspective view similar to FIG. 2 showing the trim piece mounted to the grille;

FIG. 4 is a perspective rear view of a portion of the trim piece;

FIG. 5 is a perspective rear view showing the trim piece assembled to the portion of the grille as in FIG. 3;

DETAILED DESCRIPTION

Figure 1:
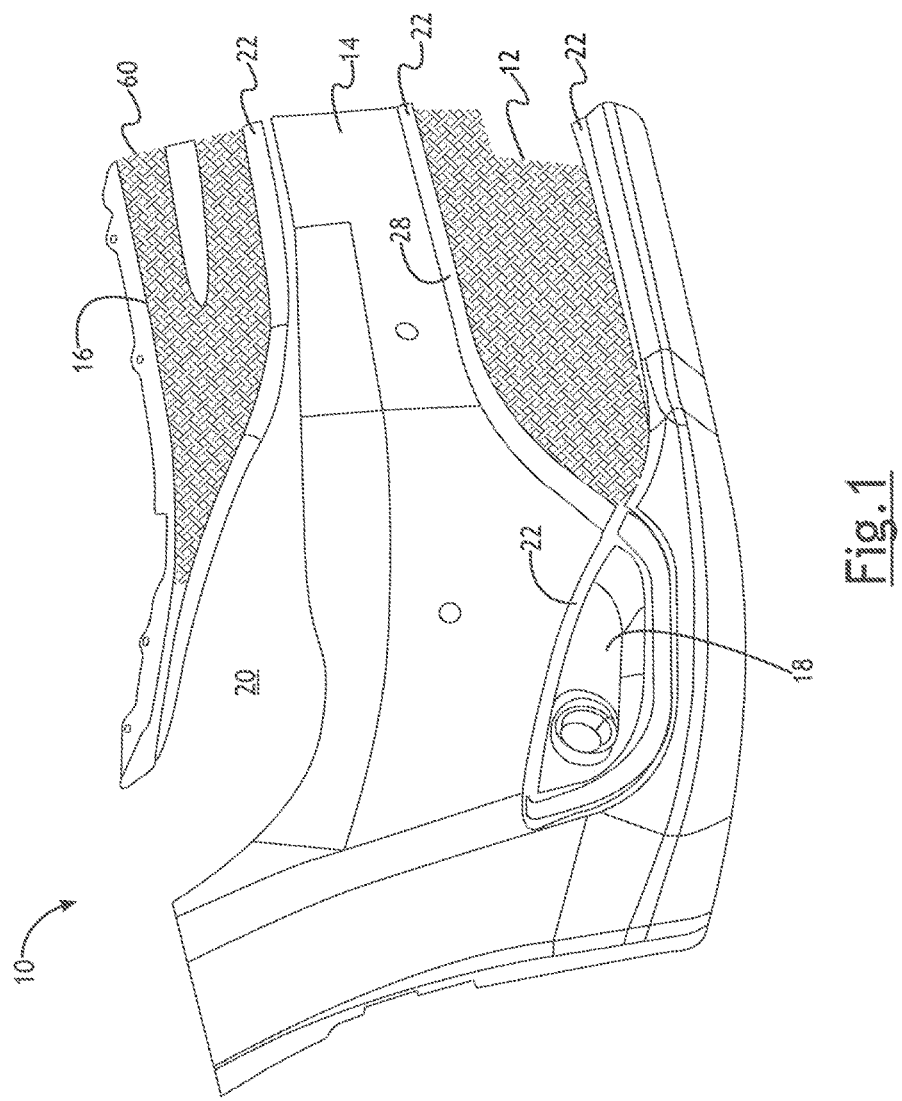
FIG. 1 is a perspective view of a portion of a front fascia, grille and related exterior vehicle components.

Referring in more detail to the drawings, FIG. 1 illustrates portions of various exterior automotive body components 10 of a vehicle, specifically a front end of the vehicle, including portions of a lower grille 12, front fascia 14, and an upper grille 16. A pocket 18 for a fog lamp is shown, but the area 20 for the headlight on that side of the vehicle is empty as the headlight may be provided in a separate subassembly. The components 10 may be mounted to various vehicle structural components which are hidden behind the exterior components when the vehicle is assembled. In this way, portions of the components 10 are exposed to view from an exterior of the vehicle and these portions of the components define a so-called "show surface" of the components. The show surfaces of the various components may be decorative, have a desired aesthetic appearance and may include decorative trim pieces 22 mounted to the grilles, a fascia, or other components, as desired.

In at least some implementations, with one example shown in FIGS. 1-3, a first exterior automotive body component, such as a decorative trim piece 22, may be mounted to a second exterior automotive body component (e.g. upper grille 16). Both the trim piece and the second component to which the trim piece is mounted may have show surfaces. The trim piece, by way of non-limiting examples, may have a different shape, color, texture or other characteristic, such as being formed from a different material, that distinguishes it from the adjacent component. In some vehicles, a decorative trim piece may be a chromed metal, or a plastic made to look like chrome. In the example shown in FIGS. 2 and 3, the trim piece 22 is mounted to the upper grille 16, but similar trim pieces may also be mounted to the lower grille 12, may surround a portion of the fog lamp pocket 18 or be provided elsewhere on the vehicle exterior. The trim piece 22 may generally surround all or a portion of a periphery of the component to which it is mounted to hide seams, points of connection to other components, or to provide a desired appearance for that portion of the vehicle.

Figure 6:
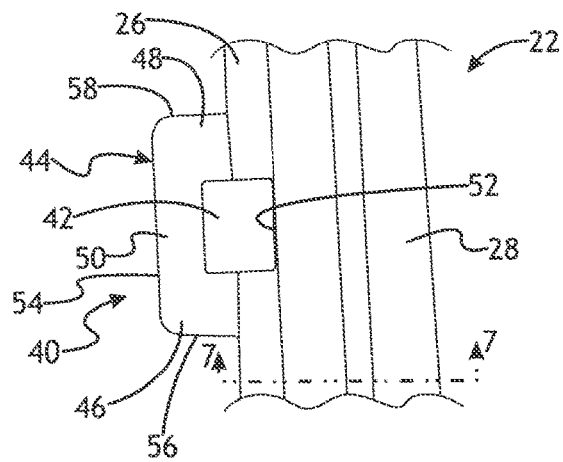
FIG. 6 is a fragmentary plan view of a trim piece including an integral connector.
Figure 7:
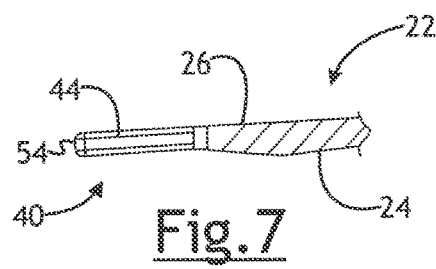
FIG. 7 is a side sectional view of the portion of the trim piece shown in FIG. 6.
Figure 10:
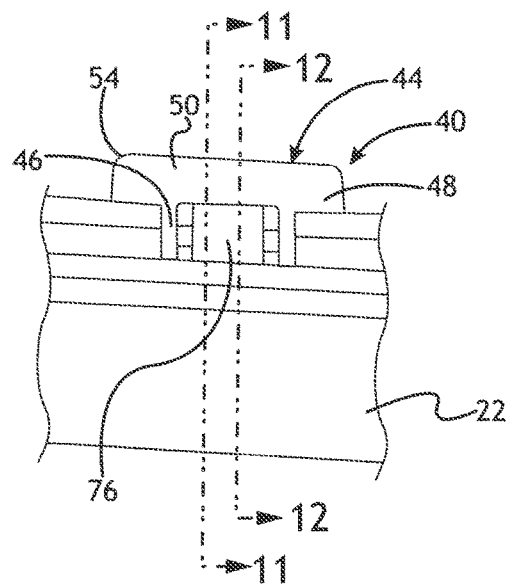
FIG. 10 is a plan view of a portion of the trim piece of FIGS. 6 and 7, and the grille of FIGS. 8 and 9, illustrating the connectors of these components mated together to couple the trim piece to the grille.

In more detail, the example of FIG. 1 illustrates a first automotive exterior body component, e.g. the trim piece 22, a portion of which is shown separately in FIGS. 4, 6 and 7, and connected together with a second automotive exterior body component, e.g. the upper grille 16, in FIGS. 2, 3, 5 and 10-12. The first component 22 may be formed in any desired shape and size. A portion of the representative first component 22 is shown in FIGS. 2, 3 and 5, and only a small segment of the first component is shown in FIGS. 6, 7 and 10. The first component 22 may also be formed of any desired material, including various polymers that may be relatively lightweight, durable and able to provide a desired show surface. The first component 22 includes an inner surface 24 that is hidden from view in assembly, and an outer surface 26, a portion of which defines a show surface 28. In the example shown, the show surface 28 is curved and convex, while the inner surface 24 is concave and defines a cavity or chamber 30 (FIG. 11) between the first and second components.

As shown in FIGS. 3 and 10-12, the show surface 28 of the first component 22 is exposed to view from the exterior of the vehicle, in other words, not covered by another component such that it would be hidden from view from the vehicle exterior. The first component 22 may also include portions of the outer surface 26 that are hidden from view and do not define the show surface 28. These portions of the outer surface 26 may include one or more support surfaces 32 that engage the second component 16 to, for example, help retain the position of the first component 22 relative to the second component 16, hide a seam on the second component, or hide areas where the second component is connected to the another vehicle component (e.g. a structural vehicle rail, wall or the like). As shown in FIGS. 4 and 10-12, the first component 22 may be generally U-shaped with a first leg 34 defining a support surface 32 that is overlapped or engaged by the second component 16, a curved or actuate middle section 36 an exterior of which includes the show surface 28, and a second leg 38 that is coupled to the second component 16 to retain the first component on the second component (or vice versa). Of course, this is just one example and the first component may have other shapes, as desired.

To facilitate connection of the first component 22 to the second component 16, one or more first connectors 40 may be carried by and/or fixed to the first component. In at least some implementations, such as is shown in FIGS. 3-5, multiple first connectors 40 are provided and the first connectors are integrally formed with the first component 22 when the first component is formed (e.g. molded) so that the connectors and remainder of the first component are portions of a homogenous component. The connector could be defined at least in part by an insert that is overmolded by the material forming the first component, if desired. Otherwise, the connector(s) 40 could be formed separately from the first component 22 and later adhered, welded or otherwise fixed to the first component so that the connector is carried by the first component.

The first connectors 40 may include an opening 42 that is at least partially bounded or surrounded by the material of the first connector. As shown in FIGS. 3-5, the first connectors 40 may be provided along either or both of the first and second legs 34, 38. The first connector 40 shown in FIGS. 10-12 includes an opening 42 that is formed in the second leg 38 and is completely enclosed within the first component 22, although other embodiments may be utilized. In more detail, a retainer 44 extends outwardly from an edge of the second leg 38, and may be generally aligned or planar with the second leg. As shown in at least FIG. 6, the retainer 44 has two sides 46, 48 that are connected together by an end wall 50, and the sides and end wall all define boundaries or edges of the opening 42, with an edge 52 of the second leg 38 also defining part of the opening in this example. Thus, the opening 42 may be considered to be fully or at least partially bounded by the retainer. The retainer 44 has a length extending outwardly from the edge 52 to an outer surface 54 of the end wall 50, a width extending laterally from an outer side surface 56 of one side 46 to the outer side surface 58 of the other side 48, and a thickness extending from the inner surface 24 to the outer surface 26.

Figure 11:
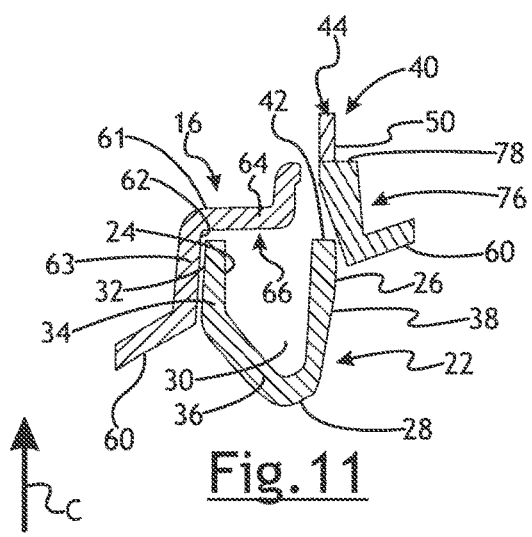
FIG. 11 is a sectional view taken generally along line 11-11 in FIG. 10.
Figure 12:
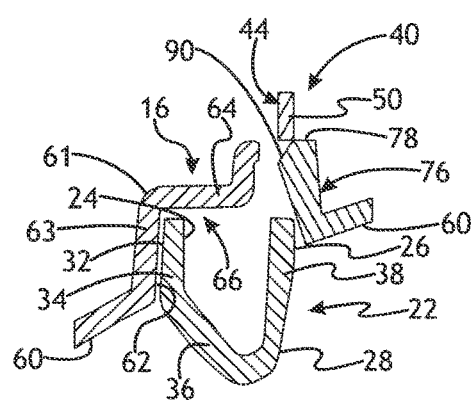
FIG. 12 is a sectional view taken generally along line 12-12 in FIG. 10.

The second automotive exterior body component 16 may be formed in any desired shape and may be formed of any desired material, including various metals or polymers that may be relatively lightweight, durable and able to provide a desired show surface. As shown in FIGS. 1-3, 11 and 12, a show surface 60 of a main body of the second component may be exposed to view from the exterior of the vehicle, in other words, not covered by another component (e.g. the first component 22) such that it is hidden from view. The second component 16 may also include an inner surface 61 (FIGS. 5, 8, 11 and 12), and outer surface 62 hidden from view and not defining the show surface 60. The outer surface 62 may include one or more support surfaces that engage the first component 22 to, for example, help retain the position of the first component relative to the second component 16, hide a seam or edge of the first component, or hide areas where the second component is connected to the another vehicle component (e.g. a structural vehicle rail, wall or the like). As shown in FIGS. 11 and 12, the second component 16 may include a pocket or partial channel 66 in or against which the first component is received. The channel 66 may be defined by a sidewall 63 and an end wall 64, with the sidewall defining a support surface and the end wall defining a stop surface that may be engaged by an end of the first leg 34 of the first component 22 to limit movement of the first component into the channel.

Figure 8:
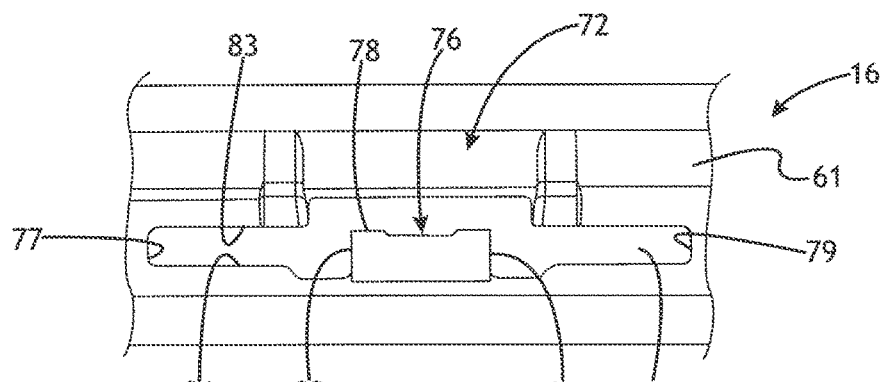
FIG. 8 is a rear view of a portion of a grille illustrating a connector portion of the grille.
Figure 9:
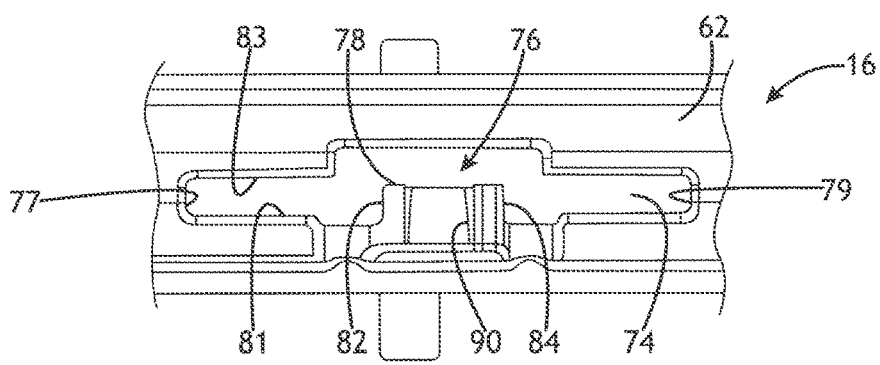
FIG. 9 is a front view of the portion of the grille shown in FIG. 8.

The second component 16 illustrated in this example is the upper grille, and portions of the upper grille are shown separately in FIGS. 8 and 9, and in assembly with the first component 22 in FIGS. 10-12. To facilitate connection of the first component 22 and second component 16, one or more second connectors 72 may be carried by and/or fixed to the second component 16. In at least some implementations, multiple second connectors 72 are provided along the length of the second component 16 and the second connectors are integrally formed with the second component when the second component is formed (e.g. molded) so that the connectors and remainder of the second component are portions of a homogenous molded component, and/or it may be overmolded by the material of the second component. Otherwise, the second connector(s) 72 could be formed separately from the second component 16 and later adhered, welded or otherwise fixed to the second component so that the second connectors are carried by the second component.

The second connectors 72 may include an opening 74 that is at least partially surrounded by the material of the second connector, and a tab 76 that extends into or overlaps the opening. The opening 74 may extend through the second component from the outer surface 62 to the inner surface 61 and be of a shape and size to receive the retainer 44 at least partially into and through the opening 74. The opening 74 has a width between opposed side surfaces 77, 79 that is greater than the width of the retainer 44, and a height between opposed surfaces 81, 83 that is greater than the thickness of the retainer. Finally, the opening 74 may extend through the second component 16 in a direction generally perpendicular to an assembly direction C (see FIGS. 2 and 11) of the first component to the second component, as will be discussed in more detail below.

The tab 76 may be arranged for receipt at least partially in the opening 42 of the first connector 40 when the first component 22 is assembled to the second component 16. In at least some implementations, the tab 76 is flexible and resilient and overlaps or extends partially into the opening 74 in a normal, unflexed state. In the implementation shown, the tab 76 is cantilevered to the second component 16 providing a free end 78 that overlaps part of the opening 74 as noted above (e.g. the free end 78 of the tab 76 is height-wise between edges 81, 83 of the opening 74). In this way, the tab 76 overlaps a portion of the opening 74 and reduces at least one dimension of at least part of the opening (e.g. provides an area of reduced height). In the example shown, when the tab 76 is in the unflexed state, an area between the free end 78 of tab and the opposite surface 83 of the opening 74 has a height less than the thickness of the retainer 44 (or whatever portion of the retainer is aligned and to be received in the opening 74 in assembly). The tab 76 has a width that is less than the width of the opening 42 in the first connector 40, and the tab is arranged in the opening 42 so that the sides 46, 48 of the retainer 44 may be received between the sides 82, 84 of the tab 76 and the opposed side surfaces 77, 79 defining the opening 74 in the second component 16.

To assemble the first component 22 to the second component 16, the first connector retainer 44 is inserted into the second connector opening 74 in direction C (FIGS. 2 and 11). In this way, the retainer can be described as extending from the first component in a direction parallel to the intended assembly direction for the first component. As the retainer 44 passes into the opening 74, the end wall 50 of the retainer 44 engages and flexes the tab 76 in a direction so that the free end 78 overlaps the opening 74 less. When the end wall 50 passes the tab 76, the tab resiliently returns to or at least partially toward its unflexed state so that a portion of the tab 76 is received within the boundaries of the opening 42 in the first connector 40 (e.g. the retainer 44 overlaps the tab 76 in the direction of the thickness of the retainer, in other words, the tab is at least partially within an area bounded by the surfaces that define the opening 42). This aligns the free end 78 of the tab 76 with the retainer end wall 50, and movement of the first component 22 relative to the second component 16 in a direction opposite to the installation direction C is inhibited or prevented by interference (e.g. engagement) of the tab 76 with the retainer end wall 50, as generally shown in FIG. 11.

Hence, the first connector(s) 40 may simply be pressed into the second connector(s) 72 to retain the first component 22 to the second component 16. An audible click may be heard when the end walls 50 clear the tabs 76. This click can be confirmed at each connector interface during installation to ensure that the first and second connectors 40, 72 are fully coupled and prevent inadvertent uncoupling of the connectors. A suitable number of connectors 40, 72 may be provided along the length of overlap between the first and second components, taking into account the weight of the first component and any forces that the components may experience in use.

As best shown in FIGS. 9 and 12, the tab 76 may include a void 90 (shown as a slot) formed in its outer surface and between its sides 82, 84. As shown in FIG. 12, the slot 90 may provide a gap between the first component 22 and second component 16 to facilitate removal of the first component from the second component, such as may be desirable to permit repair or replacement of either component. In at least some implementations, the slot 90 is sized to receive part of a tool (e.g. the blade of a flat head screwdriver) that may be inserted between the components 16, 22 and operable to flex the tab 76 out of the first connector opening 42 to permit withdrawal of the retainer 44 from the second connector 72 in a direction opposite to the assembly direction C.

In at least some implementations, the first component 22 and second component 16 may be formed from different materials, although this is not required. The first component 22 may be formed from a material that is harder than the material from which the second component 16 is formed. The tab 76 may then be provided in the softer material which may improve the flexibility of the tab and reduce assembly effort compared to a stiffer, less flexible tab. The more rigid material for the retainer 44 may also improve retention of the first component 22 relative to the second component 16 by, for example, resisting breakage of the retainer, and facilitate making the retainer relative small. Because the end wall 50 of the retainer 44 extends through the second component 22, clearance must be provided behind the second component 16 in the area of the opening 74, which may position the second component (and first component) further away from a vehicle support structure on which the second component is mounted. This may affect the overall vehicle appearance as the dimension of the vehicle associated with the components is extended a like amount (here, the front of the vehicle, so the amount that the grille 16 and trim pieces 22 extend from the front of the vehicle).

Hence, the first component 22 includes one or more first connectors 40, and the second component 16 includes one or more second connectors 72 adapted to mate with the first connectors. The components 16, 22 may be coupled together by these connectors 40, 72, without any other connectors or fasteners, if desired. In particular, threaded fasteners, rivets or other fasteners separate from the components can be reduced in number or avoided, as can adhesives, tape or other bonding agents, which facilitates handling and assembly of the components.

What is claimed is:
1. An assembly, comprising:
 a first component formed from a polymer and including an exterior show surface and a first connector, the first connector having a first opening surrounded by a retainer; and a second component formed from a polymer and including an exterior show surface and a second connector, the second connector having a second opening and a flexible and resilient tab that has an unflexed position in which the tab at least partially overlaps the second opening, wherein the first opening is spaced from the show surface of the first component and the second opening and tab are spaced from the show surface of the second component and, in assembly, first connector is coupled to the second connector with the retainer at least partially extending through the second opening, the tab being received within the first opening and overlapped by the retainer so that removal of the first component from the second component is inhibited by interference between the tab and the first component, and wherein the show surface of the first component and the show surface of the second component are both visible from an exterior of the coupled components.

2. The assembly of claim 1 wherein the retainer extends outwardly from an edge of the first component in a direction parallel to a direction of assembly of the first component to the second component for insertion of the retainer at least partially through the second opening.

3. The assembly of claim 1 wherein the first component overlaps a portion of the second component with the show surface of the first component exposed at an exterior of the second component, and with the first opening and second opening hidden behind the show surface of the first component.

4. The assembly of claim 1 wherein the first component is formed from a material that is harder than the material from which the second component is formed.

5. The assembly of claim 1 wherein the first component includes a support surface spaced from the first connector and the second component includes a support surface spaced from the second connector and wherein the support surfaces are overlapped and in contact with each other when the first connector is coupled to the second connector.

6. The assembly of claim 1 wherein the first connector is integrally formed in the same piece of material as the show surface of the first component.

7. The assembly of claim 1 wherein the second connector is integrally formed in the same piece of material as the show surface of the second component.

8. An assembly, comprising:
a first component formed from a polymer and including an exterior show surface and a first connector, the first connector having a first opening bounded by a retainer; and
a second component formed from a polymer and including an exterior show surface and a second connector, the second connector having a second opening and a flexible and resilient tab that has an unflexed position in which the tab at least partially overlaps the second opening, wherein the first opening is spaced from the show surface of the first component and the second opening and tab are spaced from the show surface of the second component and, in assembly, first connector is coupled to the second connector with the retainer at least partially extending through the second opening, the tab being received within the first opening and overlapped by the retainer so that removal of the first component from the second component is inhibited by interference between the tab and the first component, and wherein the show surface of the first component and the show surface of the second component are both visible from an exterior of the coupled components wherein the second component includes an outer surface on which the show surface is defined and an inner surface opposite the outer surface, and wherein the second opening extends through the second component from the outer surface to the inner surface and the first component overlaps the second opening and a portion of the outer surface of the second component adjacent to the show surface of the second component.

9. The assembly of claim 1 wherein the retainer is generally U-shaped with two sides joined together by an end wall, and wherein the tab includes side edges that are spaced from side surfaces that define part of a periphery of the second opening, and the side edges of the tab are spaced from the side surfaces of the second opening by at least the width of retainer sides so that the retainer may be received through the second opening and the tab may be received between the retainer sides.

10. An assembly, comprising:
a first component formed from a polymer and including an exterior show surface and a first connector, the first connector having a first opening bounded by a retainer; and
a second component formed from a polymer and including an exterior show surface and a second connector, the second connector having a second opening and a flexible and resilient tab that has an unflexed position in which the tab at least partially overlaps the second opening, wherein the first opening is spaced from the show surface of the first component and the second opening and tab are spaced from the show surface of the second component and, in assembly, first connector is coupled to the second connector with the retainer at least partially extending through the second opening, the tab being received within the first opening and overlapped by the retainer so that removal of the first component from the second component is inhibited by interference between the tab and the first component, and wherein the show surface of the first component and the show surface of the second component are both visible from an exterior of the coupled components wherein the tab is coupled to the second component at a fixed end and has a free end that at least partially overlaps the opening of the second connector when the tab is in the unflexed state.

11. The assembly of claim 10 wherein the tab, when in the unflexed state, overlies the opening of the second connector in a direction that reduces a height of at least part of the opening of the second connector to a size less than a thickness of the retainer, and wherein the tab may be flexed to increase the effective height of the opening of the second connector to a size equal to or greater than the thickness of the retainer.

* * * * *